Patented Apr. 20, 1937

2,077,411

UNITED STATES PATENT OFFICE 2,077,411

PROCESS OF TREATING FRUIT

Rodney B. Harvey, St. Paul, Minn.

No Drawing. Application May 23, 1934, Serial No. 727,108. Renewed June 29, 1936

3 Claims. (Cl. 99—103)

The artificial coloration of fruits, by the destruction of chlorophyll or the natural color thereof, is today a standard marketing practice, particularly in the case of bananas (where the destruction of chlorophyll or the natural color thereof accompanies the ripening of the fruit) and in the citrus industry. The necessity for such artificial coloration, in the case of mature citrus fruits, is succinctly set forth by the Department of Agriculture, in its Year Book for 1932, wherein it is stated, (pages 134–137):

"Some of the early fall varieties of oranges and grapefruit ripen while the fruit is still green in color. Later varieties that mature in the spring or summer assume the color of full maturity during the winter while the fruit is still immature, but when warm spring weather occurs the rind may turn green again. Thus while the edible part of the fruit ripens, there is a 'regreening' of the rind. Grapefruit growing inside of densely foliated trees never develops full color, although some of the best-flavored fruit is produced there. There is, therefore, no definite relation between flavor or maturity and the color of the fruit while on the tree. However, there is a very significant relation between the color of the fruit offered for sale and the price that it will bring, and citrus fruit producers have always faced the problem of making the color of ripe fruit match its flavor."

For convenience in demonstrating the uses and advantages of this invention, reference will be made to its applicability to citrus fruits only, but it is to be understood that my invention is applicable to other similar fruits having chlorophyll-containing cells in the skin, rind or covering thereof, and which covering is intimately associated with oily substances and waxes either in the covering or on the exterior surface thereof or protective growths thereon.

The first crude processes for decolorization of citrus fruits began in 1910, so far as I am aware, and consisted of exposing the fruits to the gases contained in the vapors resulting from the combustion of kerosene in ordinary kerosene burner stoves. It was found that exposure to these gases in airtight, or nearly airtight, treating rooms resulted in the destruction of chlorophyll or of the natural color thereof, and exposure of the color previously masked by the chlorophyll. Various improvements in methods of application were worked out during the following ten years or so.

In 1923, Dr. Frank E. Denny published the result of his research on this subject and his discovery that the coloration of citrus fruits came about through the action on the fruit of the unsaturated hydrocarbon gases contained in these vapors. In U. S. Letters Patent No. 1,475, 938 it is stated that ethylene gas is the most effective of the blanching agents in these vapors.

In consequence of these disclosures, citrus fruits are today colored by exposure to ethylene gas released in the "color-rooms" in concentrations, usually, of one cubic foot of the gas to each 3000 cubic feet of air space in the coloring room.

It has further been found that for optimum results, under the ethylene process, the temperature in coloring rooms should be maintained at 70° to 75° F., with humidity close to the saturation point. Unfortunately, these conditions of temperature and humidity appear to furnish highly favorable conditions for the propagation and growth of the spores of the various fungus diseases, such as the blue and green molds, the Diplodia and Phomopsis rots or decays, which attack the fruits in the groves and packinghouses, and during transportation and marketing. These diseases of citrus cost growers and marketing agencies, as well as the receivers and dealers in citrus fruits in destination markets, enormous sums of money annually, and any reduction in the amount thereof will benefit the entire industry.

Further, the ethylene gas treatment has the effect of greatly stimulating the respiration of the fruits, the increase in rate of respiration being approximately one hundred per cent. Inasmuch as the time of exposure ranges ordinarily from 36 hours to 120 hours, the result of this long continued treatment is a weakening of the vitality of the fruit, making it more vulnerable to disease and decay.

Further, unless facilities are available for maintaining humidity at or close to the saturation point, this long continued stimulation of respiration in the fruit results in loss of moisture from the fruit, and "withering" or "ageing" of the fruit.

Further, under present packinghouse practice, the capacity of the packinghouse, as a whole, is limited by coloring capacity, that is, if fruit has a high concentration of chlorophyll in the peel, and colors slowly, it may be necessary to suspend packing operations, awaiting completion of the coloring process. It is not possible, as a practical matter, to treat the fruit with ethylene gas and depend upon the blanching action continuing after removal from the coloring room, it appearing that the capacity of the oils and waxes of the peel to absorb these gases from the atmosphere is rather limited, necessitating frequent, or continuous, additions of the gases. A method of treatment that would result in a higher concentration of the blanching agents in the waxes and oils of the peel, as, for instance, contacting the peel of the fruit with these materials, (all of which are soluble in the waxes and oils of the peel) in liquid form, thereby causing the waxes and oils to absorb and hold sufficient of these blanching agents to accomplish the destruction of the chlorophyll color, without any retreatment, thereby avoiding the long continued exposures of past, would avoid these undesirable features of the old practice.

Because of the co-incidence of the stimulation of metabolic processes of the fruit, particularly respiration, along with destruction of chlorophyll in the peel, it has been assumed that the destruction of chlorophyll came about through an acceleration of the processes of metabolism of the whole fruit.

As a result of my research along these lines, I am of the belief that stimulation of the metabolic processes of the whole fruit is to be avoided just as far as possible, as being injurious to the fruit. It appears that this stimulation of metabolism is merely co-incidental, and not necessary, to the destruction of the chlorophyll, but that the blanching action comes about through the blanching agents being absorbed by and dissolved in the waxes and oils of the peel, later diffusing into the green cells, resulting in a stimulation of the chlorophyll destroying mechanism in the peel of the fruit, and the destruction of the chlorophyll or of the color thereof.

Whether or not the foregoing explanation or theory of the mechanism of the reaction is correct, and independently of any such explanation of the said reaction of the mechanism, I have discovered that it is possible to avoid the weakening of the vitality of the fruit, the encouragement of diseases and decays and interference with packing operations, by bringing about the destruction of the chlorophyll, or the green color, through the use, in liquid form, of certain materials that are soluble in, and are absorbed by, the waxes and oils of the peel of the fruit, which materials have a vapor and boiling range sufficiently high to prevent undue wastage of the materials by evaporation.

These and other objects, uses and advantages will become apparent to those skilled in the art from the following general and detailed description of a preferred mode of operation and of certain variations thereof.

Generally speaking, some of the materials that I have found effective as blanching agents are the amylenes, butylenes, hexylenes, heptylenes, and crude mixtures of these unsaturated hydrocarbons normally present in substances produced in the fractionization of gasoline from the so-called "cracking" processes; also oil soluble addition products of the unsaturated hydrocarbons, such as ethylene di-iodide, and chlorohydrins, such as ethylene chlorohydrin, propylene chlorohydrin, also ethylene iodohydrin, ethylene butyrohydrin, ethylene acetohydrin and ethylene formohydrin, or other oil soluble derivatives of olefin hydrocarbons.

It will be understood, however, that my invention is not limited to the blanching agents specifically enumerated above, but that I may use any blanching liquid or blanching agent in liquid form (i. e., in the form of the pure liquid, or a solution, dispersion, emulsion, et cetera) that is sufficiently soluble in the fruit waxes, oil substances and cell walls of the chlorophyll cells, of the fruit covering, to penetrate into and through the same and into contact with the chlorophyll itself, or into contact with the chlorophyll destroying mechanism of the peel.

In order to facilitate understanding, particular reference will now be made to examples of the adaptation of the invention.

The destruction of the chlorophyll, or of the chlorophyll color, may be accomplished by (a) Contacting the whole fruit with a blanching agent or material, in the pure or relatively pure state, causing the blanching agent to be taken up by the waxes and oils of the peel, which absorbed material, later diffusing into the chlorophyll containing cells, results in destruction of the chlorophyll, or of the chlorophyll color, through stimulation of the chorophyll decomposing mechanism of the peel, or by direct action.

While this is an operative method, it is not a preferred method of application, being more expensive as compared to other methods, because of the fact that there is necessarily considerable waste of materials removed from the treating tank or vessels on the fruit.

However, I may use this method by immersing the fruits in, for instance, tri-iso-butylene, keeping the fruits submerged therein for two minutes, following which the oranges are taken from the treating vessel, excess materials removed, the fruits dried, polished and packed in the conventional manner, and stored under conditions simulating transportation and commercial storage. At the end of forty eight to ninety six hours, it will be found that the chlorophyll, or the chlorophyll color, has been destroyed, and the yellow coloration of the orange disclosed.

(b) Contacting the whole fruit with a liquid containing the blanching material and wetting, or surface-tension destroying agents, whereby the blanching material is brought into such intimate contact with the peel of the fruit as to cause the said blanching material to be taken up or absorbed by the waxes or oils of the peel, which absorbed blanching material later diffuses into the chlorophyll containing cells, resulting in the destruction of the chlorophyll, or of the natural color thereof, through stimulation of the chlorophyll destroying mechanism of the fruit, or by direct action.

As an example of such a liquid, I may prepare one formula therefor by dissolving 40 grams of soap flakes, of as nearly a neutral soap as is readily obtainable, by heating in 100 c. c. of water; when a clear solution has been obtained, allow to cool to room temperature. While agitating this soap solution by stirring with an electrical mixing device, add 10 c. c. of ethylene-glycol-monobutyl-ether (butyl cellosolve). Emulsify with the resulting emulsion, 20 c. c. of tri-iso-butylene, or ethylene-formo-hydrin, or ethylene butyrohydrin, which are preferred materials, as blanching agents. A finely divided emulsion containing the blanching agent, and some of the butyl-cellosolve, will be obtained. This mixture should then be diluted with water to secure 2000 c. c. of the total mixture. After heating the solution to 110° F., immerse the green colored oranges therein, and allow to remain therein for from three to ten minutes, depending upon the intensity of the green color desired to be removed, then withdraw the oranges, rinse, dry, polish and pack in the conventional manner.

After storage for from forty eight to ninety six hours, corresponding to the time ordinarily in transit to the markets, it will be found that the green color has been removed, disclosing the yellow or orange color beneath.

It is obvious, of course, that different lots of fruit will require higher or lower concentrations of the blanching agents in the solution; that for the same reason the time of exposure by immersion may necessarily be longer or shorter; that all of the materials will not have the same identical efficiency, and that their use must be varied according to the strength of blanching action required. As a general rule, however, it may be said that the concentration of blanching agents in the total solution may vary between .05% to 2%; the time of immersion may range from one minute to twenty minutes, but ordinarily will be from five to ten minutes; the temperature of the treating solution may vary from about 30° F. to about 120° F., with a preferred range between 85° F. and 110° F., and within these limits the person familiar with the art will have no difficulty in selecting the proper material for blanching, or in varying the formula to meet existing conditions.

These and other advantages, modifications and adaptations will occur to those skilled in the art, as will variations in formulae, necessary to adapt the invention disclosed to specific conditions, according to the fruit to be treated, it being understood that all such changes and modifications, uses and adaptations and variations of this invention as come within the scope of the appended claims, are embraced thereby.

I claim:

1. The method of blanching fruits, the protective coverings of which are normally intimately associated with oily substances, fruit waxes, and chlorophyll bearing cells, comprising bringing the fruit into intimate contact with a blanching liquid comprising an olefin hydrocarbon.

2. The method of blanching fruit, the protective coverings of which are normally intimately associated with oily substances, fruit waxes and chlorophyll bearing cells, which comprises bringing the fruit into intimate contact with a blanching liquid comprising an oil-soluble addition product of an olefin hydrocarbon.

3. The method of blanching fruit, the protective coverings of which are normally intimately associated with oily substances, fruit waxes and chlorophyll bearing cells, which comprises bringing the fruit into intimate contact with a blanching liquid comprising an oil-soluble hydrin derivative of an olefin-hydrocarbon.

RODNEY B. HARVEY.